Patented Jan. 12, 1937

2,067,682

UNITED STATES PATENT OFFICE 2,067,682

PROCESS OF COOKING EDIBLES

Reuben Romney, Jr., Salt Lake City, Utah, assignor to Cheezits Corporation, Salt Lake City, Utah, a corporation of Utah No Drawing. Application March 4, 1936, Serial No. 67,093

4 Claims. (Cl. 99—1)

My invention relates to a new process of cooking edibles, and more particularly to a process of cooking either dough or batter in deep fat and then coating the edible so cooked with a coating of cheese.

A further object is to provide a cheese coating for any edible which is cooked in deep fat, said edible being one which carries very little or no grease in itself.

A further object is to provide a new process of cooking in which any suitable edible may be cooked in deep fat with particles of cheese introduced into the fat while in the process of cooking, to cause the cheese to adhere to the edible either wholly or in part to make a new and unique cheese coated confection.

A still further object is to provide a new process of cooking in which bread dough, doughnut batter, yeast dough, or baking powder batter, may be cooked in deep fat and while so cooking may be simultaneously coated with a coating of cheese and also to impregnate the dough and batter with a cheese flavor.

These objects I accomplish with the following process of cooking:

In manufacturing my edible for market or restaurant use, I make the dough as in raising bread or make a batter such as for doughnuts or waffles and then either of these are rolled out or formed to make the size and shape desired; then the edible is ready for cooking. The cheese must be prepared before the edibles are cooked so that it will be in the proper condition for use. Just any cheese will not do for it must be of a certain consistency and have just the proper amount of moisture. The cheese is grated or rather finely divided in any suitable manner to a medium fine consistency and left exposed to the air in suitable drying racks or dehydrated until it carries just the proper amount of water content. This can only be determined by using a small amount of fat and when the cheese has dried to test it in the hot fat to see whether it is ready for use. The cheese so tested must not melt into the fat, but must be so that when the edibles are cooking in the hot fat the cheese will adhere thereto. When the dough or batter is ready and the cheese is ready the fat is heated to a degree equal to that used for making potato chips or the commonly 'doughnut". The edibles are then set in the fat to cook and cooked until nearly done at which time the desired amount of the semi-dried cheese is sprinkled onto the surface of the hot fat. The cheese will instantly settle into the fat and sputter while it is melting and as this is in process, the hot fat is stirred with the edibles therein in order to bring the edibles into contact with the cheese and the cheese will then commence to adhere to the edibles. As the stirring continues, the cheese continues to adhere to the edibles until the edibles are entirely done and brown to the desired degree, at which time they are removed in trays, set to drain off the excess fat therefrom. The coated edibles so formed are then packed for sale in any suitable container. In restaurants the edibles may be served piping hot if desired.

It is fully understood that this process of cooking may be used to cook any desired edible, and any slight modifications or variations in the process to accomplish the same result are claimed to be a part of this application and within the scope of the claims.

This is a continuation in part of my application from my former patent application filed in the United States Patent Office under Serial No. 14,127, under date of April 1, 1935, for Process of cooking edibles. In this application I make no specific claim to the process of preparing cheese coated potato slices or chips, since that constitutes the subject matter of my application aforesaid, now patent Reissue #20,040.

Having thus described my invention, I desire to secure by Letters Patent and claim:

1. A process of cooking edibles, consisting of introducing the edible into deep hot fat, partially cooking the edible in said fat and then when the edible is nearly done, adding particles of cheese to the surface of the fat to adhere the cheese to the edible and impregnate the cheese flavor thereinto.

2. A process of cooking edibles such as dough comprising introducing the dough into hot fat; introducing particles of cheese having a small moisture content into the fat during the last stages of cooking and then removing the cheese coated dough from the fat when done and draining off the excess fat.

3. A process of cooking edibles, such as are made of baking powder batter, comprising introducing some of said batter into hot fat; cooking until nearly done and then spreading particles of cheese over the surface of the fat to coat the edibles with cheese and permeate the edible with cheese flavor.

4. A process of preparing cheese coated edibles comprising making a dough or batter, forming the dough or batter into desired shapes, placing such shapes in a bath of hot grease and cooking the shapes, and before the cooking has been completed, adding finely divided cheese to the mass to cause the cheese to adhere to such shapes, then after the cooking has been completed, removing the shapes from the grease and draining off excess grease therefrom.

REUBEN ROMNEY, Jr,